(12) United States Patent
Ayoub et al.

(10) Patent No.: US 9,792,370 B2
(45) Date of Patent: Oct. 17, 2017

(54) IDENTIFYING EQUIVALENT LINKS ON A PAGE

(71) Applicant: International Business Machines Corporation, Armonk, NY (US)

(72) Inventors: Khalil A. Ayoub, Ottawa (CA); Paul Ionescu, Ottawa (CA); Iosif Viorel Onut, Kanata (CA); Wayne Duncan Smith, Kanata (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 622 days.

(21) Appl. No.: 13/915,960

(22) Filed: Jun. 12, 2013

(65) Prior Publication Data
US 2013/0346387 A1    Dec. 26, 2013

(30) Foreign Application Priority Data

Jun. 26, 2012 (CA) ...................................... 2781391

(51) Int. Cl.
*G06F 17/30* (2006.01)

(52) U.S. Cl.
CPC .. *G06F 17/30867* (2013.01); *G06F 17/30864* (2013.01)

(58) Field of Classification Search
CPC ............................................... G06F 17/30864
See application file for complete search history.

(56) References Cited

U.S. PATENT DOCUMENTS

| 5,999,929 | A | 12/1999 | Goodman |
| 6,952,730 | B1* | 10/2005 | Najork et al. ................. 709/225 |
| 7,676,465 | B2 | 3/2010 | Poola |
| 7,680,773 | B1* | 3/2010 | Acharya et al. .............. 707/737 |
| 7,886,217 | B1* | 2/2011 | Henzinger et al. ........... 715/205 |
| 2006/0218143 | A1* | 9/2006 | Najork ............................... 707/6 |
| 2008/0010292 | A1* | 1/2008 | Poola .............................. 707/10 |
| 2008/0091685 | A1 | 4/2008 | Garg et al. |
| 2008/0134015 | A1 | 6/2008 | Milic-Frayling et al. |

(Continued)

FOREIGN PATENT DOCUMENTS

EP    1638016 A1    3/2006

OTHER PUBLICATIONS

Bar-Yossef, Z. et al., "Do Not Crawl in the DUST: Different URLs with Similar Text," In ACM Journal of Transactions on the Web (TWEB), vol. 3, No. 1, Art. 3, Jan. 2009, 2pgs.

(Continued)

*Primary Examiner* — Khanh Pham
(74) *Attorney, Agent, or Firm* — Cuenot, Forsythe & Kim, LLC

(57) ABSTRACT

A computer-implemented process for identifying equivalent links on a page responsive to a determination that the crawler has not visited all required universal resource locators, locates a next URL to be crawled to form a current URL and processes the current URL to identify equivalent URLs. Responsive to a determination that the crawler has not visited the current URL, determine whether necessary to crawl all identified equivalent URLs and responsive to a determination that it is necessary to crawl all identified equivalent URLs, adding all equivalent URLs to a list of URLs to be crawled.

20 Claims, 8 Drawing Sheets

(56) References Cited

U.S. PATENT DOCUMENTS

2008/0228675 A1* 9/2008 Duffy et al. .................. 706/10

OTHER PUBLICATIONS

Chakrabarti, d., et al. "Method and System for Matching DOM Trees to Search Logs for Accurate Webpage Clustering," [online] IP.com, Disclosure No. IPCOM000195337D dated Apr. 30, 2010, Yahoo! © 2010, retrieved from the Internet: <http://ip.com/IPCOM/000195337>, 1 pg.

Soon, L.K. et al., "Identifying Equivalent URLS Using URL Signatures," [online] in IEEE Int'l. Conf. on Signal Image Technology and Internet Based Systems (SITIS '08), pp. 203-210, IEEE 2008.

Nie, T. et al., "Crawling Result Pages for Data Extraction Based on URL Classification," In Web Information Systems and Applications Conference (WISA), 2010 7th, pp. 79-84, IEEE, Aug. 20-22, 2010.

Lin, S.H. et al., "Automatic sitemaps generation: Exploring website structures using block extraction and hyperlink analysis," Expert Systems with Applications, vol. 38, No. 4, pp. 3944-3958, Apr. 2011.

* cited by examiner

Link equivalency system 300

IDENTIFYING EQUIVALENT LINKS ON A PAGE

CROSS-REFERENCE TO RELATED APPLICATIONS

This application claims the benefit of Canada Application Number 2781391 filed on Jun. 26, 2012, which is fully incorporated herein by reference.

BACKGROUND

A website crawler is a tool that performs an automatic exploration of a website. The task of exploration is beneficial for many applications including simple information indexing tasks, as well as a more complex compliance testing.

One challenge automated tools face is capability to understand whether two or more universal resource locator (URL) links on a page perform equivalent actions. A determination is important because websites, for example, comprising news, blogs, on-line stores, and emails, have a massive quantity of URL links typically providing a similar type of navigation action, bringing a user to equivalent pages. In practice the link equivalency collapses into a single news link, a single blog entry, a single item in the store, a single email, respectively. A common term for these links is equivalent links.

Exploring all possible equivalent links of a website is a time consuming task that is not required in all cases. For example, when performing a security scan, a web crawler is more concerned in identifying a structure of a webpage, than in the text content. Using this example, exploring just one equivalent link would be sufficient, and the results could be generalized for the remaining instances.

In addition to the initial identification problem, most websites on subsequent visits change the set of equivalent links displayed to the user. Accordingly, a news letter will show the latest news, a blog will show the latest blogs, an on-line store will probably show the items on sale, to name a few. The crawling of such websites is thus further complicated because the container page containing all the equivalent links is typically never the same, therefore a crawler is not be able to know the web page was a previously visited web page.

Current solutions to the problem typically require a web crawler to examine the page content returned by each link to determine whether the links are equivalent. The web crawler uses heuristics to omit portions of the page that will commonly differ between similar pages, for example, advertisements, but this practice leads to inaccurate results where either too much information or too little information is omitted. Improvements to this technique require a user to create hypertext markup language (HTML) expressions to indicate which portions of pages to omit when comparing the pages to determine similarity.

In addition, existing techniques use the same page structure comparisons to determine whether the structure of the webpage stays the same during subsequent visits and discard the page after a period of time. This technique indirectly solves the problem of equivalent links, because the web crawler works with the structure of the page, rather than the attribute values of the page. Other solutions require expert knowledge in configuring the crawler to ignore certain portions of the URL.

BRIEF SUMMARY

According to one embodiment, a computer-implemented process for identifying equivalent links on a page, determines whether a crawler visited all required universal resource locators and responsive to a determination that the crawler has not visited all required universal resource locators, locates a next URL to be crawled to form a current URL. The computer implemented process processes the current URL to identify equivalent URLs, determines whether the crawler visited the current URL, and responsive to a determination that the crawler has not visited the current URL, determines whether necessary to crawl identified equivalent URLs. Responsive to a determination that it is necessary to crawl identified equivalent URLs, the computer implemented process adds all equivalent URLs of the identified equivalent URLs to a list of URLs to be crawled.

According to another embodiment, a computer program product for identifying equivalent links on a page, comprises a computer recordable-type storage medium containing computer executable program code stored thereon. The computer executable program code comprises computer executable program code for determining whether a crawler visited all required universal resource locators, computer executable program code responsive to a determination that the crawler has not visited all required universal resource locators, for locating a next URL to be crawled to form a current URL, computer executable program code for processing the current URL to identify equivalent URLs, computer executable program code for determining whether the crawler visited the current URL, computer executable program code responsive to a determination that the crawler has not visited the current URL, for determining whether necessary to crawl identified equivalent URLs and computer executable program code responsive to a determination that it is necessary to crawl identified equivalent URLs, for adding all equivalent URLs of the identified equivalent URLs to a list of URLs to be crawled.

According to another embodiment, an apparatus for identifying equivalent links on a page, comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to determine whether a crawler visited all required universal resource locators and responsive to a determination that the crawler has not visited all required universal resource locators, locate a next URL to be crawled to form a current URL. The processor unit further executes the computer executable program code to direct the apparatus to process the current URL to identify equivalent URLs, determine whether the crawler visited the current URL, and responsive to a determination that the crawler has not visited the current URL, determine whether necessary to crawl identified equivalent URLs. Responsive to a determination that it is necessary to crawl identified equivalent URLs, the processor unit further executes the computer executable program code to direct the apparatus to add all equivalent URLs of the identified equivalent URLs to a list of URLs to be crawled.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
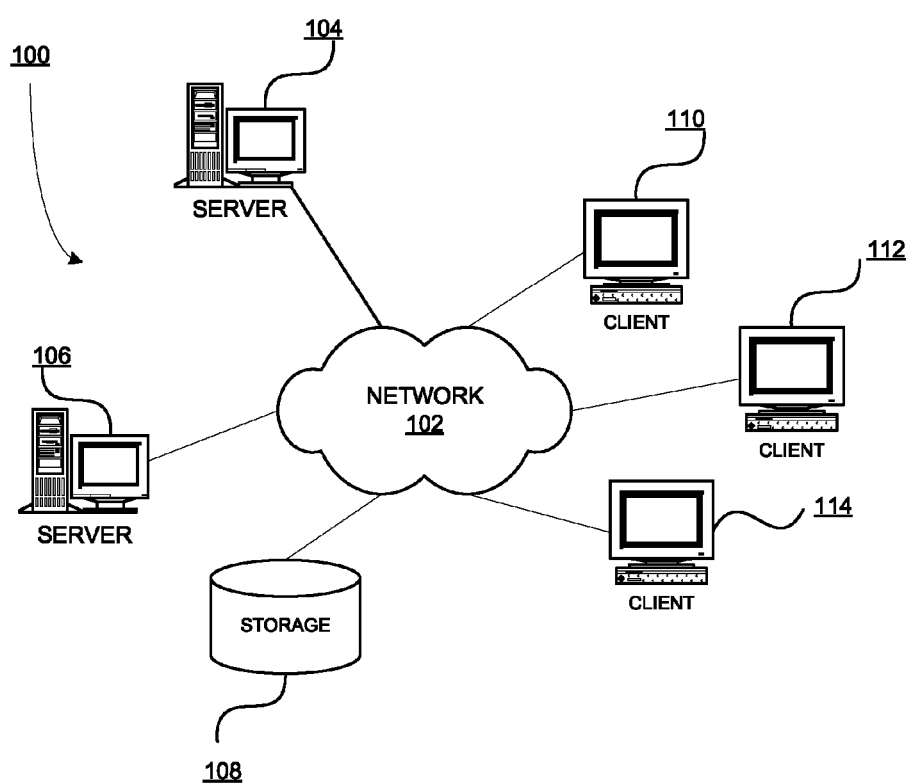
FIG. 1 is a block diagram of an exemplary network data processing system operable for various embodiments of the disclosure.

This disclosure relates generally to data access, analysis and delivery in a data processing system and more specifically to information and data management using search applications and scan applications in the data processing system.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
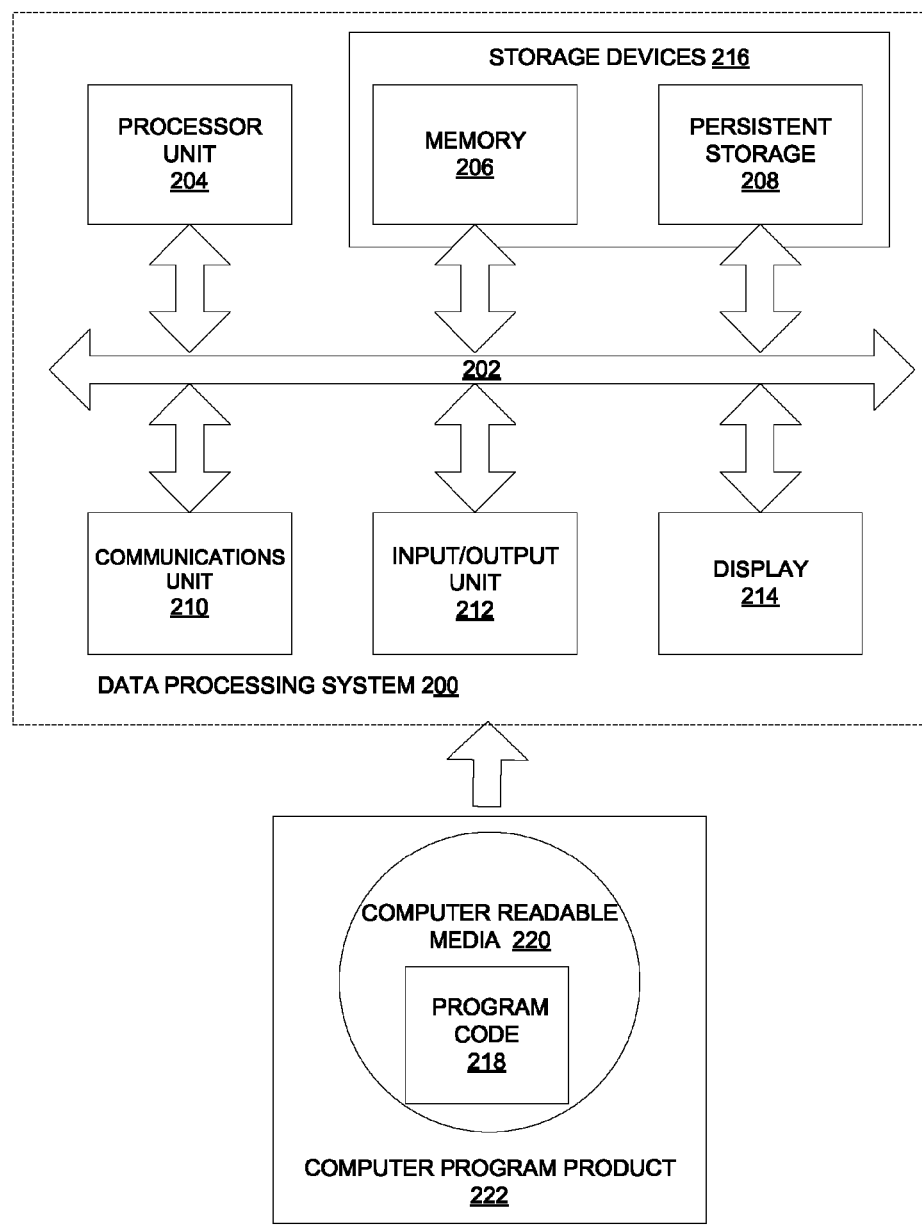
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for identifying equivalent links on a page is presented. Processor unit 204 determines whether a crawler visited all required universal resource locators and responsive to a determination that the crawler has not visited all required universal resource locators, processor unit 204 locates a next URL to be crawled to form a current URL. Processor unit 204 processes the current URL to identify equivalent URLs and determines whether the crawler visited the current URL. Responsive to a determination that the crawler has not visited the current URL, processor unit 204 determines whether necessary to crawl identified equivalent URLs and responsive to a determination that it is necessary to crawl identified equivalent URLs, processor unit 204 adds all equivalent URLs of the identified equivalent URLs to a list of URLs to be crawled.

Using an embodiment of the disclosed process typically enables a crawler to identify links containing equivalent URLs automatically, providing information enabling operations including to direct a scanning operation or limit the scanning purpose; enable the crawler to recognize a container page has been visited before, since the only information that has changed was equivalent to initial information; and avoid exploring equivalent URLs when data provided is not meaningful for the current task.

Web application security scanning typically focuses on testing the functionality of the page rather than content. This means not determining whether two pages that are structurally the same have different content. Identifying link equivalence typically prevents the crawler from having to identify, in later operations, equivalent links lead to pages that are structurally the same and have the same functionality. Embodiments of the disclosed process accordingly enable the crawler to detect link equivalence prior to crawling the links.

For example, typical security scanning software attempts to identify similar functioning web pages and when found the remaining pages are typically skipped to avoid duplicate processing. Embodiments of the disclosure provide an approach to avoid such additional processing. Embodiments may also be used to identify higher priority links that should be visited. Another embodiment provides a capability for a developer to test for security compliance without having to wait for an exhaustive scan, however the end user is warned that this is an approximation and not an exhaustive check.

Figure 3:
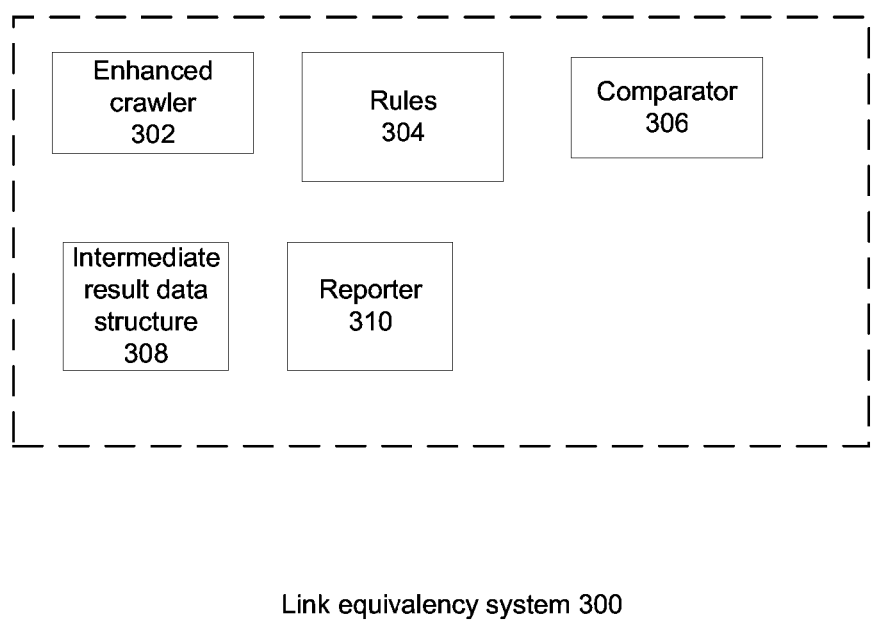
FIG. 3 is a block diagram of a link equivalency system operable for various embodiments of the disclosure.

With reference to FIG. 3 a block diagram of a link equivalency system operable for various embodiments of the disclosure is presented. Link equivalency system 300 is an example of a link equivalency system, in accordance with the described process.

Link equivalency system 300 contains components comprising enhanced crawler 302, rules data structure 304, comparator 306, intermediate results data structure 308 and reporter 310. Link equivalency system 300 leverages support of an underlying data processing system, for example network data processing 100 of FIG. 1 or data processing 200 of FIG. 2. Components of link equivalency system 300 may be implemented in alternative configurations comprising a number of discrete components as in FIG. 3 or a combination of components wherein the elements may be combined into logical or physical functional units with other components of the underlying data processing system or in a standalone form.

Enhanced crawler 302 provides a capability of a conventional crawler with additional functions to exploit controlling logic contained within rules 304 to direct the process behavior. Rules 304 are contained within a rules data structure accessible to components of link equivalency system 300, in particular enhanced crawler 302. In the example embodiment, rules 304 contains predetermined conditional statements including equivalent URLs will follow a similar URL pattern, an HTML statement containing a URL has a same number of HTML attributes, all attribute values for the HTML element containing the URL are the same, and subsequent visits to pages will likely have different equivalent URLs. Examples are further described in the forthcoming FIG. 4 and FIG. 5. The rules are cumulative, so that an identified equivalent link must satisfy all applied conditions.

Comparator 306 provides a capability to analyze two document object model representations of a page associated with a given URL. The analysis determines whether predetermined conditions are met and when the conditions are met, identifying the URLs meeting those conditions.

Intermediate results data structure 308 provides a capability to store results during the processing operations. For example, a set of links identified in a first portion of the process is stored for subsequent use in identifying groups of links which satisfy a same set of multiple conditions and a final set of which used by reporter 310.

Reporter 310 provides a capability of outputting a result, in one example, containing remaining sets of URLs or in another example, a pointer to a location of the results.

Figure 4:
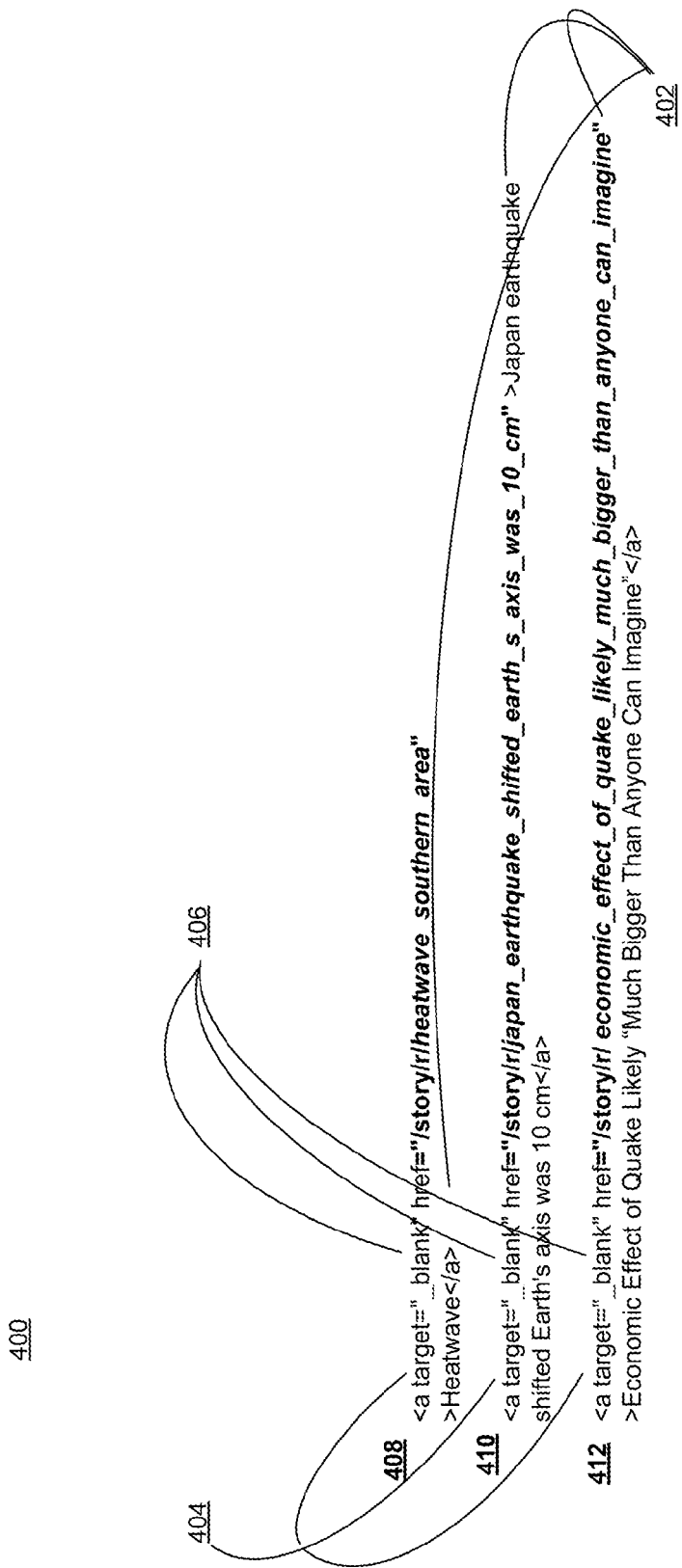
FIG. 4 is a textual representation of a set of URLs processed using the link equivalency system 300 of FIG. 3 operable for various embodiments of the disclosure.

With reference to FIG. 4 a set of URLs processed using the link equivalency system 300 of FIG. 3 operable for various embodiments of the disclosure is presented. The set of URLs is provided as an example relating to application of the predetermined conditions defined in rules 304 of FIG. 3. The examples reflect use of a news web site such as Digg™, (available at www.digg.com, from Digg, Inc).

In example code snippet 400, a first predetermined condition asserts equivalent URLs will follow a similar URL pattern, as shown in portion 402 of statements 408, 410 and 412. A second predetermined condition asserts the HTML element that contains the URL has the same number of HTML attributes as shown in portion 404 of statements 408, 410 and 412.

A third predetermined condition asserts all the attribute values for the HTML element that contains the URL are the same, as shown in portion 406 of statements 408, 410 and 412. There are typically a few attributes that will be an exception to this rule such as HTML tags including id, alt, and title. Therefore, the exceptional tags should be excluded from a comparison.

A fourth predetermined condition asserts subsequent visits to the same pages will likely have different equivalent URLs.

Figure 5:
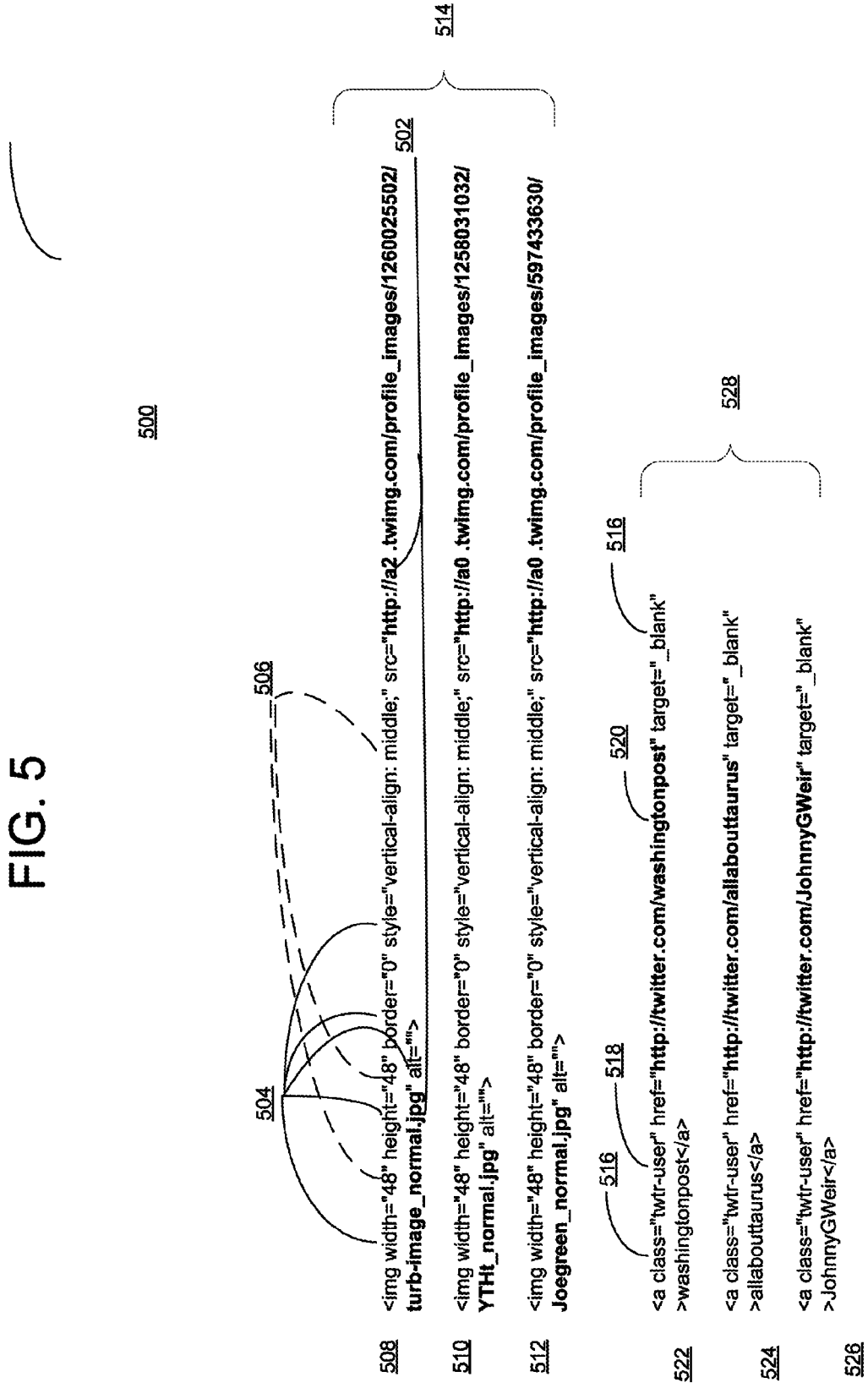
FIG. 5 is a textual representation of a set of URLs processed using the link equivalency system 300 of FIG. 3 operable for various embodiments of the disclosure is presented.

With reference to FIG. 5 a set of URLs processed using the link equivalency system 300 of FIG. 3 operable for various embodiments of the disclosure is presented. The set of URLs is provided as an example relating to application of the predetermined conditions defined in rules 304 of FIG. 3. The examples reflect use of a social networking site, for example Twitter (available at www.twitter.com from Twitter, Inc.).

A page published on the Twitter site typically comprises a layout in which a left red box presents a selection of who is available, represented by set of statements 514 and a right red box indicating top tweets, represented by set of statements 528.

With reference to set of statements 514 comprising statements 508, 510, and 512, a first predetermined condition asserts equivalent URLs will follow a similar URL pattern, as shown in portion 502. A second predetermined condition asserts the HTML element that contains the URL has the same number of HTML attributes as shown in portion 504 of statements 508, 510 and 512.

A third predetermined condition asserts all the attribute values for the HTML element that contains the URL are the same, as shown in portion 506 of statements 508, 510 and 512. As previously stated, there are typically a few attributes that will be an exception to this rule such as HTML tags including id, alt, and title. Therefore, the exceptional tags should be excluded from a comparison.

A fourth predetermined condition asserts subsequent visits to the same pages will likely have different equivalent URLs.

With reference to set of statements 528 comprising statements 522, 524, and 526, a first predetermined condition asserts equivalent URLs will follow a similar URL pattern, as shown in portion 516. A second predetermined condition asserts the HTML element that contains the URL has the same number of HTML attributes as shown in portion 518 of statements 522, 524 and 526.

A third predetermined condition asserts all the attribute values for the HTML element that contains the URL are the same, as shown in portion 520 of statements 522, 524 and 526. As previously stated, there are typically a few attributes that will be an exception to this rule such as HTML tags including id, alt, and title, which are accordingly excluded from a comparison.

A fourth predetermined condition asserts subsequent visits to the same pages will likely have different equivalent URLs.

Figure 6:
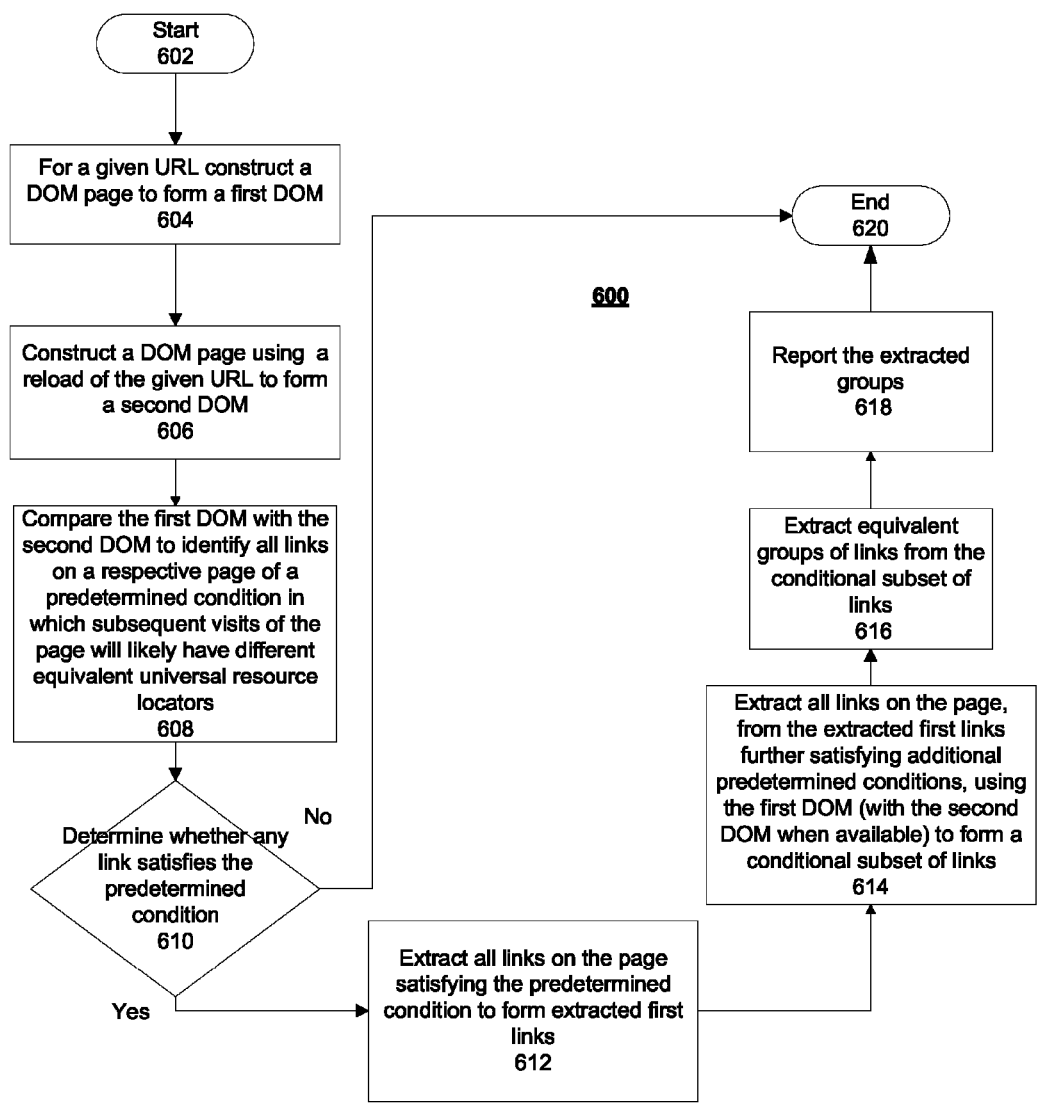
FIG. 6 is a flowchart of a link equivalency process operable for various embodiments of the disclosure.

With reference to FIG. 6 a flowchart of a link equivalency process operable for various embodiments of the disclosure is presented. Process 600 is an example of using the link equivalency system 300 of FIG. 3.

Process 600 begins (step 602) and receives a given URL from which a document object model (DOM) representation of a page associated with the given URL is constructed to form a first DOM (step 604). Process 600 constructs a DOM page using a reload of the given URL to form a second DOM (step 606). Reloading the page indicated by the given URL typically results in changes to information presented.

Process 600 compares the first DOM with the second DOM to identify all links (the URLs) on a respective page complying with a predetermined condition (step 608). In the example, the predetermined condition was previously defined as one, which asserts subsequent visits to the same pages, will likely have different equivalent URLs, as defined in rules 304 of FIG. 3.

Process 600 determines whether any link satisfies the predetermined condition of step 608 (step 610). Responsive to a determination no link satisfies the predetermined condition of step 608, process 600 terminates (step 620). Responsive to a determination links satisfy the predetermined condition of step 608, process 600 extracts all links on the page satisfying the predetermined condition of step 608 to form extracted first links (step 612).

Process 600 extract all links on the page, from the extracted first links, which further satisfy additional predetermined conditions, using the first DOM (with the second DOM when available) to form a conditional subset of links (step 614). The additional predetermined conditions are those previously defined as the first predetermined condition, second predetermined condition and third predetermined condition asserted in defined in rules 304 of FIG. 3.

Process 600 extracts equivalent groups of links from the conditional subset of links to form extracted groups (step 616). Process 600 reports the extracted groups (step 618) and terminates thereafter (step 620). Reporting may be provided to a requester a listing presented to the requester or as an identifier resolving to a location of a data structure containing the results as a representation of the extracted groups.

The URLs on any page that comply with observations A, B, C and optionally with Observation D are equivalent, and therefore will perform equivalent operations. An embodiment of the disclosed process extracts all the links in the current page, and filters the extracted links using compliancy with the four predefined conditions. The embodiment of the disclosed process creates separate equivalency groups when needed (for example, using twitter where there are 2 equivalency groups).

Embodiments of the disclosed process do not rely on user input, rather using the predetermined conditions representative of expert knowledge observations, the disclosed process programmatically identifies equivalent URLs. Furthermore, on the same page the disclosed process provides a capability of identifying several groups of equivalent URLs. For example, with reference to the twitter example statements of FIG. 5, it is clear that all the links in the left box are equivalent with each other. In a similar manner the links in the right hand side of the twitter page are all equivalent with each other. However, the links in the right hand side box are not equivalent with the links in the left hand side box of the twitter example. The disclosed process provides a capability to recognize the similarities as well as the difference correctly.

Figure 7:
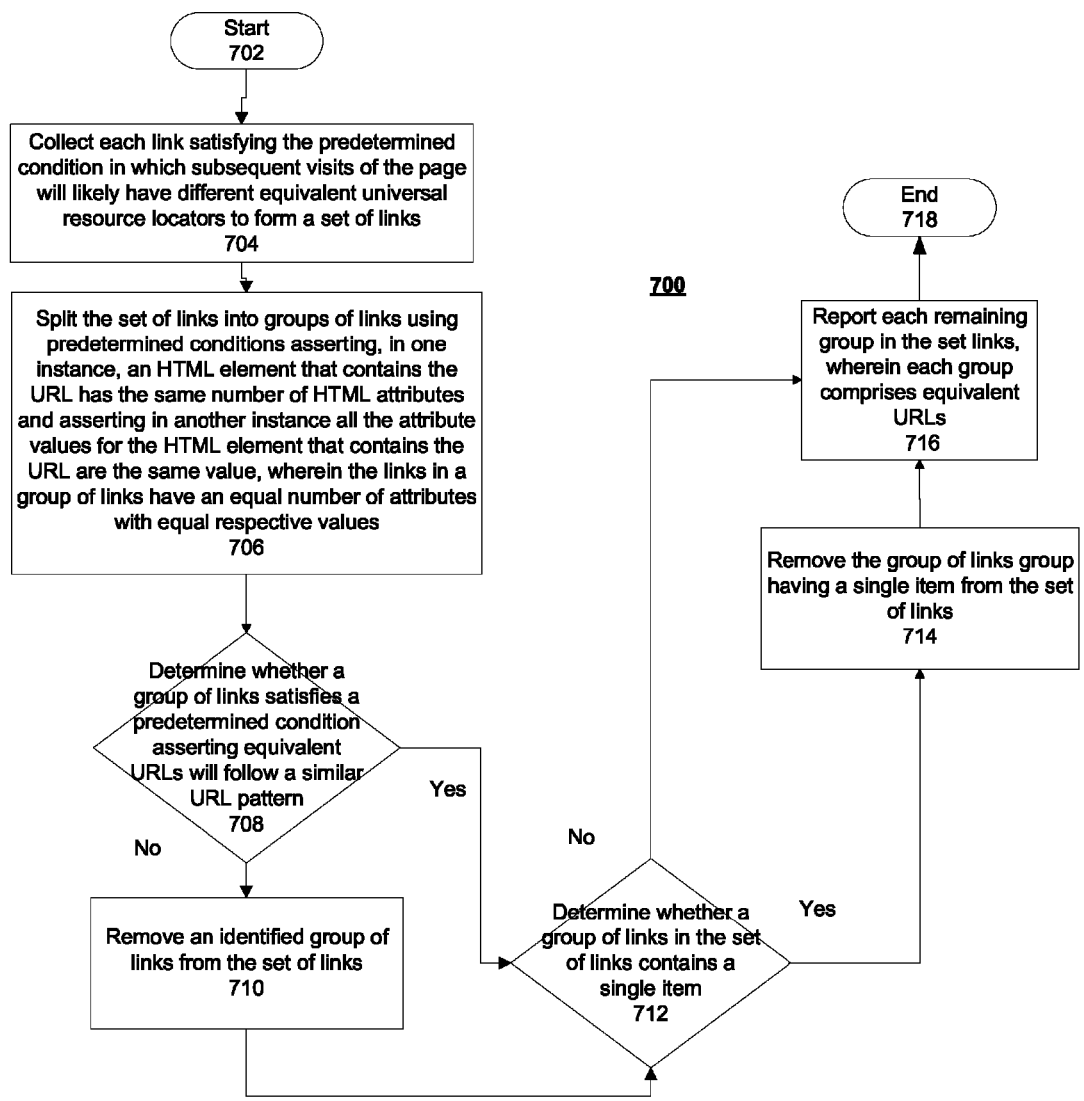
FIG. 7 is a flowchart of an extraction of equivalent groups process operable for various embodiments of the disclosure.

With reference to FIG. 7 a flowchart of an extraction of equivalent groups process operable for various embodiments of the disclosure is presented. Process 700 is an example process of extracting equivalent groups of links from the conditional subset of links to form extracted groups within process 600 of FIG. 6.

Process 700 begins (step 702) and collects each link satisfying the predetermined condition of subsequent visits to the same pages will likely have different equivalent URLs to form a set of links (step 704). Process 700 further splits the set of links created into groups (step 706). The splitting operation uses a pair of predetermined conditions asserting, in one instance, an HTML element that contains the URL has the same number of HTML attributes and asserting in another instance all the attribute values for the HTML element that contains the URL are the same value. The links in a group of links thus formed has an equal number of attributes with equal respective values.

Process 700 determines whether a group of links satisfies a predetermined condition asserting equivalent URLs will follow a similar URL pattern (step 708). Responsive to a determination that a group of links does satisfy the predetermined condition asserting equivalent URLs will follow a similar URL pattern, process 700 proceeds to step 712.

Responsive to a determination that a group of links does not satisfy the predetermined condition asserting equivalent URLs will follow a similar URL pattern, process 700 removes the group of links thus identified from the set of links (step 710).

Process 700 determines whether a group of links in the set of links contains a single item (step 712). Responsive to a determination that a group of links in the set of links does not contain a single item, process 700 proceeds to step 716. Responsive to a determination that a group of links in the set of links does contain a single item, process 700 removes an identified group of links having a single item from the set of links (step 714). Note how in the case when the crawler does not go to the same page twice, process 700 performs a cleanup task at the end, by removing all groups that contain only one link to reduce or eliminate false positives.

Process 700 reports each remaining group in the set of links wherein each group comprises equivalent URLs (step 716) and terminates thereafter (step 718).

Figure 8:
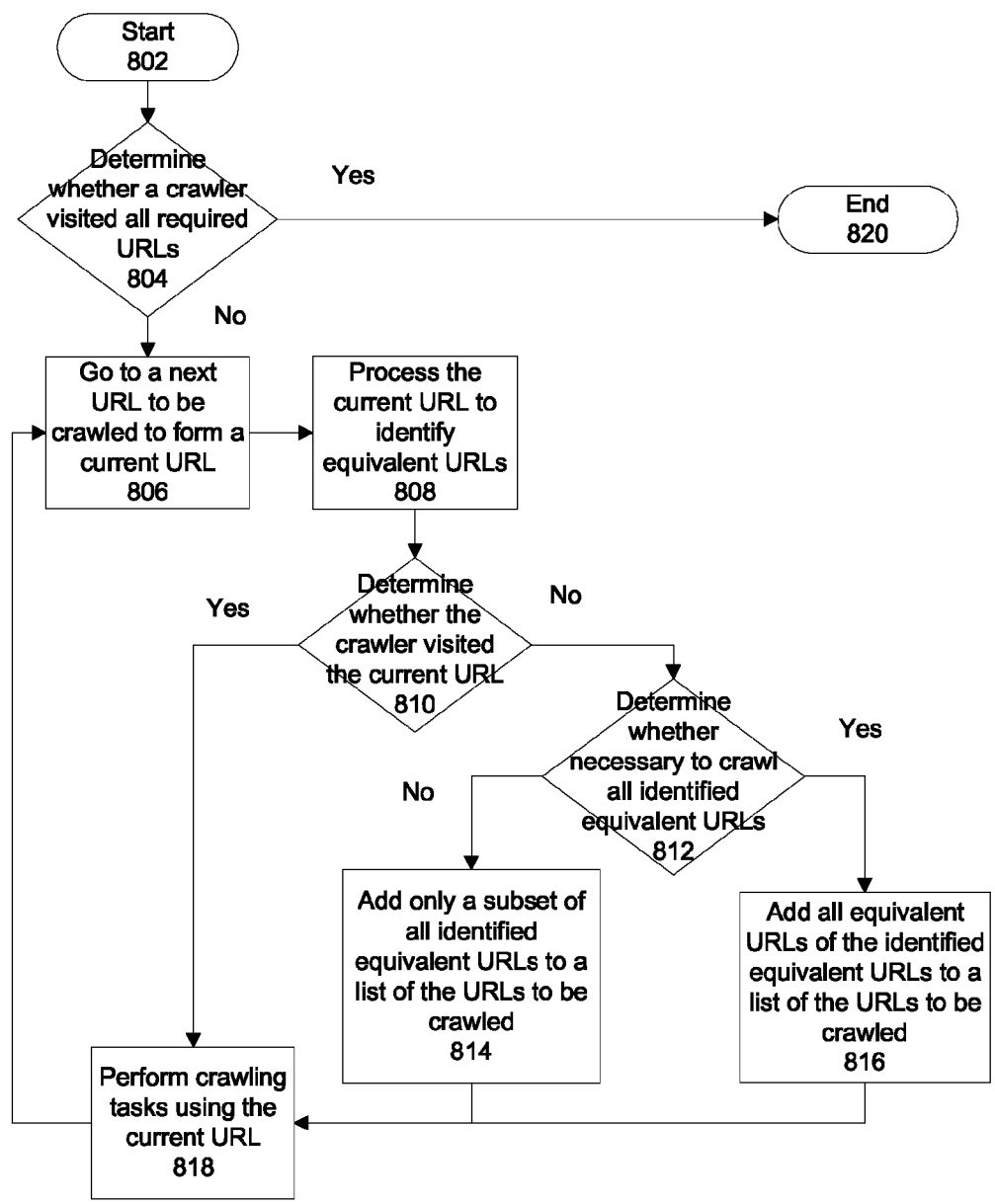
FIG. 8 is a flowchart of an enhanced crawling process operable for various embodiments of the disclosure.

With reference to FIG. 8 a flowchart of an enhanced crawling process operable for various embodiments of the disclosure is presented. Process 800 is an example of crawling a web site using integrated process 600 of FIG. 6 and integrated process 700 of FIG. 7.

Process 800 begins (step 802) and determines whether a crawler visited all required URLs (step 804). Responsive to a determination that the crawler visited all required URLs, process 800 terminates (step 820). Responsive to a determination that the crawler has not visited all required URLs, process 800 locates a next URL to be crawled to form a current URL (step 806).

Process 800 processed the current URL to identify equivalent URLs (step 808). This operation is performed using process 600 of FIG. 6 including process 700 of FIG. 7 as previously described. Process 800 determines whether the crawler visited the current URL (step 810).

Responsive to a determination that the crawler has visited the current URL, process 800, proceeds to step 818. Responsive to a determination that the crawler has not visited all required URLs, process 800 determines whether it is necessary to crawl all identified equivalent URLs (step 812).

Responsive to a determination that it is not necessary to crawl all identified equivalent URLs, process 800 adds only a subset of all identified equivalent URLs to a list of URLs to be crawled (step 814). Adding only a subset of all identified equivalent URLs to the list of URLs to be crawled enables one or more (but not all) of the equivalent URLs to added as needed to the list. Process 800 proceeds to step 818.

Responsive to a determination that it is necessary to crawl identified equivalent URLs, process 800 adds all equivalent URLs of the identified equivalent URLs to a list of URLs to be crawled (step 816). Process 800 performs crawling tasks using the current URL (step 818) and loops back to perform step 806 as before.

Process 800 improves the operation of determining whether the crawler previously visited the current URL to detect whether the content of two URLs is the same, by adding the equivalent URLs information in steps 814 and 816. Therefore, when the content of the URLs is different, but the differences all resolve to equivalent URLs, the obvious conclusion is the two web pages are exactly the same (for example, only the equivalent data has changed).

Looking at links that are equivalent and understanding which part of the link is changing, the disclosed process provides a capability to easily infer a parameter of a query URL (not necessarily a regular parameter, but could be a parameter in the path, or even in the name of the webpage, also known as URL rewriting), that is, the unique identifier of the data that each URL will uncover. Knowing that, a security scanner can mutate the parameters to test each parameter for security issues. Current products require manual customization by the user of the product. This technique enables a scan to programmatically detect a part of the URL that changes. It is quite reasonable to assume that this parameter will end up in an SQL query, and when not sanitized could lead to SQL Injection vulnerabilities. Another practice simply displays the parameter back in a response of the server to expose cross-site scripting (XSS) vulnerability when not sanitized.

Using an example from FIG. 4 of the disclosure, the portions 402 can be mutated and tested for security. For example a user my manually configure the scan, which is a very hard task to ask the user to do. In another example, when changing parts are more predictable (such as numbers) different numbers may be used to continue the exploration of those numbers to yield data. For example, when a portion comprising href="/story/r/story15223" is used to generate links not in the current page that are very likely to yield to new data, exploration may comprise a range such as /story/r/story1 to /story/r/story99999999.

Understanding equivalent links enables an understanding that in this particular website, those links are likely to be modified, and also created, and therefore, when scanning for compliance (security/accessibility) a scanner could assign a higher priority to the links, which is the opposite of ignoring the links.

As the role of security testing moves more to developers, there is a desire to have developers test a small set of security rules with a goal of having a quick scan with a low false positive rate. Applying an embodiment of the disclosed process to the application scanner provides a capability for dynamic analysis products that would allow for a quicker scan because equivalent links lead to the same DOM structure.

Configuring a dynamic analysis scan to successfully cover an entire application can be an onerous task. Embodiments of the disclosure can be used to help programmatically identify parameters in portions of the application where the patterns are identified.

Typical web crawlers could use this technique to categorize the links from a site and construct a more relevant site map and have a better internal representation of a site.

Taking the example of FIG. 4, a search engine can categorize instances of the /story/r/* pattern into a news category and provide a more efficient list of results for a target site on a news server.

Thus is presented in an illustrative embodiment a computer-implemented process for identifying equivalent links on a page. The computer-implemented process responsive to a determination that the crawler has not visited all required universal resource locators, locates a next URL to be crawled to form a current URL and processes the current URL to identify equivalent URLs. Responsive to a determination that the crawler has not visited the current URL, the computer-implemented process determines whether necessary to crawl identified equivalent URLs and responsive to a determination that it is necessary to crawl identified equivalent URLs, adding all equivalent URLs of the identified equivalent URLs to a list of URLs to be crawled.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable storage medium having computer executable instructions stored thereon in a variety of forms. Examples of computer readable storage media include recordable-type media, such as a floppy disk, a hard disk drive, a RAM, CD-ROMs, and DVD-ROMs. The present invention applies equally regardless of a particular type of signal bearing media actually used to carry out the distribution. Examples of signal bearing media include transmission-type media, such as digital and analog communications links, wired or wireless communications links using transmission forms, such as, for example, radio frequency and light wave transmissions. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process for identifying equivalent links on a page, the computer-implemented process comprising:
   determining whether a crawler visited all required universal resource locators;
   responsive to a determination that the crawler has not visited all required universal resource locators, locating a next URL to be crawled to form a current URL;
   processing the current URL, using a processor, to identify equivalent URLs;
   determining whether the crawler visited the current URL;
   responsive to a determination that the crawler has not visited the current URL, determining whether necessary to crawl all identified equivalent URLs; and
   responsive to a determination that it is necessary to crawl all identified equivalent URLs, adding all identified equivalent URLs to a list of URLs to be crawled.

2. The computer-implemented process of claim 1, wherein responsive to a determination that the crawler has visited the current URL, performing crawling tasks using the current URL.

3. The computer-implemented process of claim 1, wherein responsive to a determination that it is not necessary to crawl all identified equivalent URLs, adding only a subset of all identified equivalent URLs to a list of URLs to be crawled.

4. The computer-implemented process of claim 1, wherein processing the current URL to identify equivalent URLs further comprises:
   constructing a document object model of a page for a respective universal resource locator to form a first document object model;
   constructing a document object model of a reloaded page of the respective universal resource locator to form a second document object model;
   comparing the first document object model with the second document object model to identify all links on a respective page for which subsequent visits of the page will likely have different equivalent universal resource locators;
   determining whether a link satisfies the predetermined condition of subsequent visits of the page will likely have different equivalent universal resource locators;
   responsive to a determination that a link on the page satisfies the predetermined condition in which subsequent visits of the page will likely have different equivalent universal resource locators, extracting all links on the page satisfying the predetermined condition in which subsequent visits of the page will likely have different equivalent universal resource locators, to form extracted first links;

extracting all links on the page from the extracted first links, further satisfying additional predetermined conditions in which equivalent universal resource locators follow a similar universal resource locator pattern, an HTML element that contains the universal resource locator has a same number of HTML attributes and all attribute values for the HTML element that contains the universal resource locator are the same, using the first document object model and when available, the second document object model, to form a conditional set of links;

extracting equivalent groups of links from the conditional set of links; and reporting the extracted groups, wherein each group comprises equivalent URLs.

5. The computer implemented process of claim 2, wherein the extracting all links on the page from the extracted first links further comprises:

collecting each link satisfying the predetermined condition in which subsequent visits of the page will likely have different equivalent universal resource locators to form a set of links;

splitting the set of links into groups of links using predetermined conditions asserting in one instance an HTML element that contains the universal resource locator has a same number of HTML attributes, and asserting in another instance all attribute values for the HTML element that contains the universal resource locator are the same value, wherein the links in the group of links have an equal number of attributes with equal respective values;

determining whether a group of links satisfies the predetermined condition in which equivalent universal resource locators follow a similar universal resource locator pattern;

responsive to a determination that the group of links satisfies the predetermined condition in which equivalent universal resource locators follow a similar universal resource locator pattern, deleting an identified group of links from the set of links;

determining whether a group of links in the set of links contains a single item;

responsive to a determination that the group of links in the set of links contains a single item, deleting the group of links in the set of links containing a single item from the set of split links; and reporting each remaining group in the set of links, wherein each group comprises equivalent universal resource locators.

6. The computer implemented process of claim 1, wherein the crawler detects link equivalency before crawling of the respective link.

7. The computer implemented process of claim 1, further comprising:

identifying two or more groups of equivalent URLs, using a same page for analysis.

8. A computer program product for identifying equivalent links on a page, the computer program product, comprising:

a computer hardware storage device containing computer executable program code stored thereon, the computer executable program code comprising:

computer executable program code for determining whether a crawler visited all required universal resource locators;

computer executable program code responsive to a determination that the crawler has not visited all required universal resource locators, for locating a next URL to be crawled to form a current URL;

computer executable program code for processing the current URL to identify equivalent URLs;

computer executable program code for determining whether the crawler visited the current URL;

computer executable program code responsive to a determination that the crawler has not visited the current URL, for determining whether necessary to crawl all identified equivalent URLs; and computer executable program code responsive to a determination that it is necessary to crawl all identified equivalent URLs, for adding all identified equivalent URLs to a list of URLs to be crawled.

9. The computer program product of claim 8, wherein computer executable program code responsive to a determination that the crawler has visited the current URL, further comprises:

computer executable program code for performing crawling tasks using the current URL.

10. The computer program product of claim 8, wherein computer executable program code responsive to a determination that it is not necessary to crawl all identified equivalent URLs, further comprises:

computer executable program code for adding only a subset of all identified equivalent URLs to a list of URLs to be crawled.

11. The computer program product of claim 8, wherein computer executable program code for processing the current URL to identify equivalent URLs further comprises:

computer executable program code for constructing a document object model of a page for a respective universal resource locator to form a first document object model;

computer executable program code for constructing a document object model of a reloaded page of the respective universal resource locator to form a second document object model;

computer executable program code for comparing the first document object model with the second document object model to identify all links on a respective page for which subsequent visits of the page will likely have different equivalent universal resource locators;

computer executable program code for determining whether a link satisfies the predetermined condition of subsequent visits of the page will likely have different equivalent universal resource locators;

computer executable program code responsive to a determination that a link on the page satisfies the predetermined condition in which subsequent visits of the page will likely have different equivalent universal resource locators, for extracting all links on the page satisfying the predetermined condition in which subsequent visits of the page will likely have different equivalent universal resource locators, to form extracted first links;

computer executable program code for extracting all links on the page from the extracted first links, further satisfying additional predetermined conditions in which equivalent universal resource locators follow a similar universal resource locator pattern, an HTML element that contains the universal resource locator has a same number of HTML attributes and all attribute values for the HTML element that contains the universal resource locator are the same, using the first document object model and when available, the second document object model, to form a conditional set of links;

computer executable program code for extracting equivalent groups of links from the conditional set of links; and computer executable program code for reporting the extracted groups, wherein each group comprises equivalent URLs.

12. The computer program product of claim 9, wherein computer executable program code for extracting all links on the page from the extracted first links further comprises:

computer executable program code for collecting each link satisfying the predetermined condition in which subsequent visits of the page will likely have different equivalent universal resource locators to form a set of links;

computer executable program code for splitting the set of links into groups of links using predetermined conditions asserting in one instance an HTML element that contains the universal resource locator has a same number of HTML attributes, and asserting in another instance all attribute values for the HTML element that contains the universal resource locator are the same value, wherein the links in the group of links have an equal number of attributes with equal respective values;

computer executable program code for determining whether a group of links satisfies the predetermined condition in which equivalent universal resource locators follow a similar universal resource locator pattern;

computer executable program code responsive to a determination that the group of links satisfies the predetermined condition in which equivalent universal resource locators follow a similar universal resource locator pattern, for deleting an identified group of links from the set of links;

computer executable program code for determining whether a group of links in the set of links contains a single item;

computer executable program code responsive to a determination that the group of links in the set of links contains a single item, for deleting the group of links in the set of links containing a single item from the set of links; and computer executable program code for reporting each remaining group in the set of links, wherein each group comprises equivalent universal resource locators.

13. The computer program product of claim 8, wherein the crawler detects link equivalency before crawling of the respective link.

14. The computer program product of claim 8, further comprising:

computer executable program code for identifying two or more groups of equivalent URLs, using a same page for analysis.

15. An apparatus for identifying equivalent links on a page, the apparatus comprising:

a communications fabric;

a memory connected to the communications fabric, wherein the memory contains computer executable program code;

a communications unit connected to the communications fabric;

an input/output unit connected to the communications fabric; and a processor unit connected to the communications fabric, wherein the processor unit executes the computer executable program code to direct the apparatus to:

determine whether a crawler visited all required universal resource locators;

responsive to a determination that the crawler has not visited all required universal resource locators, locate a next URL to be crawled to form a current URL;

process the current URL to identify equivalent URLs;

determine whether the crawler visited the current URL;

responsive to a determination that the crawler has not visited the current URL, determine whether necessary to crawl all identified equivalent URLs; and responsive to a determination that it is necessary to crawl all identified equivalent URLs, add all identified equivalent URLs to a list of URLs to be crawled.

16. The apparatus of claim 15, wherein the processor unit executes the computer executable program code responsive to a determination that the crawler has visited the current URL, to direct the apparatus to perform crawling tasks using the current URL.

17. The apparatus of claim 15, wherein the processor unit executes the computer executable program code responsive to a determination that it is not necessary to crawl all identified equivalent URLs, to direct the apparatus to add only a subset of all identified equivalent URLs to a list of URLs to be crawled.

18. The apparatus of claim 15, wherein the processor unit executes the computer executable program code to construct a document object model of a page for a respective universal resource locator to form a first document object model further directs the apparatus to:

construct a document object model of a reloaded page of the respective universal resource locator to form a second document object model;

compare the first document object model with the second document object model to identify all links on a respective page for which subsequent visits of the page will likely have different equivalent universal resource locators;

determine whether a link satisfies the predetermined condition of subsequent visits of the page will likely have different equivalent universal resource locators;

responsive to a determination that a link on the page satisfies the predetermined condition in which subsequent visits of the page will likely have different equivalent universal resource locators, extract all links on the page satisfying the predetermined condition in which subsequent visits of the page will likely have different equivalent universal resource locators, to form extracted first links;

extract all links on the page from the extracted first links, further satisfying additional predetermined conditions in which equivalent universal resource locators follow a similar universal resource locator pattern, an HTML element that contains the universal resource locator has a same number of HTML attributes and all attribute values for the HTML element that contain the universal resource locator are the same, using the first document object model and when available, the second document object model, to form a conditional set of links;

extract equivalent groups of links from the conditional set of links; and report the extracted groups, wherein each group comprises equivalent URLs.

19. The apparatus of claim 16, wherein the processor unit executes the computer executable program code to extract all links on the page from the extracted first links further directs the apparatus to:
- collect each link satisfying the predetermined condition in which subsequent visits of the page will likely have different equivalent universal resource locators to form a set of links;
- split the set of links into groups of links using predetermined conditions asserting in one instance an HTML element that contains the universal resource locator has a same number of HTML attributes, and asserting in another instance all attribute values for the HTML element that contains the universal resource locator are the same value, wherein the links in the group of links have an equal number of attributes with equal respective values;
- determine whether a group of links satisfies the predetermined condition in which equivalent universal resource locators follow a similar universal resource locator pattern;
- responsive to a determination that the group of links satisfies the predetermined condition in which equivalent universal resource locators follow a similar universal resource locator pattern, delete an identified group of links from the set of links;
- determine whether a group of links in the set of links contains a single item;
- responsive to a determination that the group of links in the set of links contains a single item, delete the group of links in the set of links containing a single item from the set of split links; and
- report each remaining group in the set of links, wherein each group comprises equivalent universal resource locators.

20. The apparatus of claim 15, wherein the crawler detects link equivalency before crawling of the respective link.

* * * * *